United States Patent [19]

Hansen

[11] Patent Number: 4,716,043
[45] Date of Patent: Dec. 29, 1987

[54] PROCESS FOR MAKING PORTIONED CHEESE

[75] Inventor: Jens Peter S. Hansen, Risskov, Denmark

[73] Assignee: Jens Peter Hansen, Aarhus A/S, Denmark

[21] Appl. No.: 718,021

[22] PCT Filed: Jul. 26, 1984

[86] PCT No.: PCT/DK84/00071

§ 371 Date: Mar. 20, 1985

§ 102(e) Date: Mar. 20, 1985

[87] PCT Pub. No.: WO85/00501

PCT Pub. Date: Feb. 14, 1985

[30] Foreign Application Priority Data

Jul. 28, 1983 [DK] Denmark ............................. 3460/83

[51] Int. Cl.$^4$ ...................... A23C 9/137; A23C 19/02
[52] U.S. Cl. ......................................... 426/35; 426/39; 426/40; 426/582
[58] Field of Search ................. 426/582, 130, 35, 36, 426/38, 39, 40, 41, 42, 43, 471

[56] References Cited

U.S. PATENT DOCUMENTS

| | | |
|---|---|---|
| 1,694,921 | 12/1928 | Kaufmann et al. |
| 2,982,654 | 5/1961 | Hammond et al. ................ 99/116 |
| 3,620,768 | 11/1971 | Corbin, Jr. ........................ 99/116 |
| 4,194,011 | 3/1980 | Invernizzi et al. ................. 426/8 |
| 4,369,196 | 1/1983 | Sukegawa ......................... 426/104 |
| 4,374,152 | 2/1983 | Loter ................................ 426/39 |
| 4,460,609 | 7/1984 | Kristiansen et al. .............. 426/39 |

FOREIGN PATENT DOCUMENTS

WO84/01261 4/1984 PCT Int'l Appl. .
1413942 7/1974 United Kingdom .

OTHER PUBLICATIONS

Journal of Dairy Science 62: pp. 204–207, 1979.
Translation of the Claims of CH No. 598,768.
Translation of the Claims of DE No. 2,327,419.
Turkish Novelty Report.

*Primary Examiner*—Raymond N. Jones
*Assistant Examiner*—Marianne M. Cintins
*Attorney, Agent, or Firm*—Parkhurst & Oliff

[57] ABSTRACT

This invention relates to a process for making portioned cheese, wherein concentrated cheese milk is continuously mixed with ordinary auxiliary substances and additives, including a well-defined acidogen, for starting the curdling and ripening processes. The mixture is then filled into suitable individual packages which are closed hermetically. The process is carried out under such controlled conditions that the mixed product is liquid when it is filled into the package, wherein the product then coagulates in the package and undergoes the curdling and ripening processes when left to stand at a suitable temperature.

The above manufacturing process gives a high yield of uniform products and reduces the costs owing to the labor-saving, rational and continuous operation.

4 Claims, No Drawings

PROCESS FOR MAKING PORTIONED CHEESE

BACKGROUND OF THE INVENTION

A. Field of the Invention

The present invention relates to a process for making portioned cheese, in particular fresh unripe cheeses, such as White Cheese, Feta, Cream Cheese, Cheddar and cottage cheese.

B. Description of the Prior Art

When cheese is manufactured according to the classic method the starting material is usually cow's milk or goat's milk, which may be homogenized. The milk may be used as whole milk, i.e. with its total solids content, or a major or minor portion of the cream may be centrifuged off.

The milk is coagulated by addition of rennet, and the coagulum is processed into cheese in several processing steps, comprising filtration of the separated whey, pressing in moulds and ripening or storage of the pressed cheeses. Sometimes the coagulum is also cooked and washed.

Instead of coagulating the milk by addition of rennet it is known to effect acidification, either by addition of a lactic acid forming bacterial culture or an inorganic acid, such as phosphoric acid, or an organic acid, e.g. lactic acid or gluconic acid. Also a neutral acidogen may be added, such as glucono-delta-lactone which releases gluconic acid by hydrolysis, cf. U.S. Pat. Nos. 2,982,654 and 3,620,768.

Addition of acid to a pH below about 5.0 usually causes instantaneous coagulation of the proteins in the milk.

It is known to replace the whole milk or skim milk starting material in the cheese making by a milk concentrate formed by ultrafiltration or diafiltration of the milk. Whole milk has a solids content of about 12%, of which about 3.5% is protein, about 3.5% is fat and the balance is lactose, minerals and small amounts of other substances, such as vitamins, etc. Ultrafiltration causes removal of a large portion of the water and the low-molecular substances, in particular the lactose and minerals, dissolved in the water. In retentate with a concentration of 35 to 40% solids constitutes a liquid cheese milk, which is processed into cheese in the usual manner by coagulation of the protein, recovery of the coagulum, pressing and subsequent treatment in the usual manner.

The described method of making cheese is very time-consuming and laborious. It is moreover uneconomical in that a considerable portion of the solids of the milk is lost, e.g. by low fermentation processes, or occurs in by-products of low commercial value.

SUMMARY OF THE INVENTION

The object of the present invention is to provide a more rational and labour-saving process for making portioned cheese.

Another object of the invention is to make cheeses with an improved yield, i.e. with a greater content of the original solids content of the milk.

DETAILED DESCRIPTION OF THE INVENTION

Accordingly, the invention relates to a process for making portioned cheese, wherein concentrated cheese milk is mixed, preferably continuously, with ordinary auxiliary substances and additives, including acidogen, for starting the curdling and ripening processes, and then the mixture is filled into individual packages which are closed hermetically and left to stand at a suitable temperature until the curdling and ripening processes are completed. The process is characterized by using a chemically well-defined acidogen, adapting the amount of the acidogen and the mixing conditions, including temperatures and flow periods, etc., so that the concentrated cheese milk containing the said auxiliary substances and additives coagulates preferably after the introduction into the individual packages and is transformed through the curdling and ripening processes.

The making of cheese by the process of the invention is preferably continuous, as mentioned, there being used concentrated cheese milk, which has the composition the finished cheese is to have by addition of common auxiliary substances and additives, such as rennet, lipase, organic acids, calcium chloride, stabilizers, emulsifiers, phosphates, citrates, salts and acidogens. While liquid, the mixture is distributed in small containers, which are closed hermetically and stored under conditions which, because of the presence of acidogen, result in coagulation and cheese formation and also ripening. However, it is possible to mix the concentrated cheese milk with the auxiliary substances and the additives portionwise, but the amount of the acidogen and the conditions of mixing are then to be so adapted that the mixture is liquid, non-coagulated or only partially coagulated when it is distributed in the individual packages.

DE No. 2,734,825 and French Pat. No. 2,360,258 disclose a continuous process for making cheese, wherein a concentrated cheese milk is first produced, containing the usual auxiliary substances and additives and having the same composition as the finished cheese is to have. To convert this liquid product to cheese, a particularly adapted acid-forming bacterial culture is added immediately after the liquid product is pasteurized and while it is still hot, viz. 55° to 60° C. The product is then transferred to a container which is closed hermetically and left to stand under suitable conditions for cheese formation and ripening.

However, in this known method it is difficult to control the process and to obtain uniform end products because bacterial cultures often have a varying composition and activity, and because the mixing has to take place at a high temperature involving a risk of uncontrollable deterioration of the bacterial culture.

In the process of the invention, the cheese milk containing auxiliary substances and additives is pumped expediently through a closed pipe system in which the mixing with acidogen takes place and from where the mixture is dispensed directly into the individual packages.

As all additives have a well-defined composition, the process can be controlled with great accuracy. Thus, temperatures and treatment periods can be adjusted more favorably so that no coagulation or only partial coagulation will take place before the mixture has been transferred to the individual packages. Also the fermentation reactions and ripening processes characteristic of the cheese formation preferably take place in the package after it has been closed hermetically.

The method is very labour-saving and can be carried out without any risk of contamination. It is not necessary to add bacterial cultures, which do not have a well-defined composition and whose effect is difficult to control. The use of a chemically well-defined acidogen permits a precise pH adjustment to be maintained so that the curdling and ripening processes proceed uniformly and at a constant rate during the continuous process.

The preferred acidogen is glucono-delta-lactone, but it is also possible to use another chemical compound with corresponding properties, such as those described in the U.S. Pat. No. 3,620,768.

The finished cheese product has retained the original composition of the milk solids essentially unchanged. There is no conversion of the lactose contained in the milk. The yield is therefore high in relation to milk solids.

The cheese milk used as the starting material is expediently formed by ultrafiltration or diafiltration which gives a liquid concentrate with a high content of protein.

The additives, including the acidogen, are expediently introduced continuously by metering means in the pipe system for mixing with the cheese milk. Thus, the acidogen can be introduced in the concentrated cheese milk in the form of a dry powder by means of a screw or a worm metering device, from which the atmospheric air has been expelled by means of gaseous carbon dioxide. This obviates the necessity of suspending or dissolving the acidogen in water with consequent dilution of the cheese milk and of introducing air into the cheese, which might cause bubbles or holes.

The process of the invention will be explained more fully below by means of some working examples.

EXAMPLE 1

Milk with a pH of 6.7 and about 12% solids, of which about 3.4% is protein and about 3.5% is fat, is heated to 98° C. for 15 seconds. Then it is cooled to 60° C. and homogenized at a pressure of 190 kg/cm$^2$, cooled to 8° C. and mixed with an 0.15% starter distillate through a static in-line mixer for immediate reduction of pH to 6.10.

The mixture is allowed to rest for 0.5 to 8 hours.

The acidified milk is heated to 51° C. and ultrafiltrated to provide a retentate with 38% solids.

The retentate is mixed with an 0.1% emulsifier stabilizer and is homogenized at 60 kg/cm$^2$ and heated to 98° C. for 15 seconds and cooled to 28° C.

An 0.1% cold water mixture containing 40 parts of water, ½ part of rennet and ½ part of citrate (1:40), a 4% cold water mixture containing 1 part of water, 1 part of glucono-delta-lactone (1:1) and a 7% hot water mixture with 1 part of water, 1 part of salt (1:1) are added to the retentate in a static in-line mixer.

The mixture in liquid shape is immediately dispensed into individual plastics cups or other individual packages. The package is sealed hermetically and left to stand at room temperature until the cheese has developed into a cuttable or spreadable type by renneting, acidification, coagulation and ripening.

EXAMPLE 2

Milk with a pH of 6.7, about 12% solids, of which about 3.4% is protein and about 3.5% is fat, is mixed with 13% butter and/or vegetable fat and 13% caseinate, is heated to 98° C. for 15 seconds, cooled to 60° C. and homogenized at a pressure of 190 kg/cm$^2$ and cooled to 12° C., and 0.25% organic nutritional acid is added through a static in-line mixer for immediate reduction of pH to 5.20.

The mixture is allowed to rest for 0.5 to 8 hours. The acidified concentrate is heated to 31° C. A 4% cold water mixture containing 1 part of water, 1 part of glucono-delta-lactone, an 0.1% cold water mixture containing 40 parts of water, ½ part of rennet and ½ part of lipase and a 3% cold water mixture containing 1 part of water and 1 part of salt are added to the concentrate through a static in-line mixer.

The mixture is immediately dispensed in a liquid or partially coagulated form into plastics cups or other packages and is closed hermetically. The packaged product is left to stand until renneting, acidification, coagulation and ripening of the cheese is completed in the package.

EXAMPLE 3

Example 1 is repeated with the change that the starting material is reconstituted milk, made of 12 parts of milk solids which are dissolved in 88 parts of water and emulsified together with 13% butter, based on the weight of the finished mixture. This gives a spreadable cream cheese.

EXAMPLE 4

Example 1 is repeated with the change that the additives, i.e. rennet, citrate, glucono-delta-lactone and salt, are mixed in a dry state and introduced into the pipe system for mixing with the cheese milk by means of a worm metering device, from which the atmospheric air has been removed by flushing with gaseous carbon dioxide.

EXAMPLE 5

The procedure described in example 1 is repeated with the change that the starting material is skim milk which is subjected to diafiltration.

The cheese product obtained is of the same type as a cottage cheese.

EXAMPLE 6

Milk with a pH of about 6.5 and about 12% solids, of which about 3.4% is protein and about 3.5% is fat, is heated to about 98° C. for 15 seconds. Then it is cooled to about 60° C. and homogenized at a pressure of about 190 kg/cm$^2$, cooled to about 55° C. and ultrafiltrated to provide a retentate with about 38% solids.

The retentate is homogenized at about 60 kg/cm$^2$ and is heated to 90° C. for about 15 seconds and cooled to about 28° C. Salt in a dry state is mixed with the retentate, and 40 parts of water, ½ part of rennet and 20 parts of glucono-delta-lactone are added to the retentate.

The mixture is immediately dispensed in a liquid form into individual packages which are closed hermetically. The packaged product is left to stand until renneting, acidification and coagulation is completed, and is then left for curing at about 5° C.

The produced cheese is of the Feta type and has the composition:

| Component | Content in g per kg of cheese | Content in g per kg of solids | Method of analysis |
|---|---|---|---|
| Water/solids | 625/375 | 0/1000 | AOAC |
| Fat | 160 | 427 | AOAC |
| Protein (N × 6.37) | 119 | 317 | AACC |
| Salt | 36.9 | 98.4 | AOAC |
| Glucono-delta-lactone (GDL) | 20.5 | 54.4 | SLT |

| Component | Content in g per kg of cheese | Content in g per kg of solids | Method of analysis |
|---|---|---|---|
| Ashes (excl. salt) | 9.2 | 24.5 | AOAC |
| Phosphor | 2.4 | 6.4 | NMK |
| Carbohydrate | 29 | 77 | |

I claim:

1. A process for producing portioned cheese, consisting essentially of:

mixing a milk concentrate having a solids content of 35–40% and a temperature of between 0° to 60° C. with glucono-delta-lactone and additives selected from the group consisting of rennet, lipase, organic acids, calcium chloride, stabilizers, emulsifiers, phosphates, citrates and salts, thereby forming a liquid mixture to be coagulated, said milk concentrate obtained by ultrafiltration or diafiltration of whole milk or skim milk;

dispensing said liquid mixture, before coagulation takes place, into individual packages; and closing hermetically and storing said individual packages to permit coagulation and ripening of said liquid mixture without any contamination;

wherein the amount of glucono-delta-lactone and said temperature are selected to ensure that coagulation of said liquid mixture occurs after said liquid mixture has been dispensed into said individual containers.

2. A process according to claim 1, wherein the mixing of said milk concentrate, glucono-delta-lactone and additives is performed in the absence of air, and said dispensing is performed continuously through a pipe system directly into said individual packages.

3. A process according to claim 1, wherein said glucono-delta-lactone and additives are added to said milk concentrate in a dry powder form.

4. A process according to claim 1, wherein said glucono-delta-lactone and additives are added to said milk concentrate in a concentrated aqueous suspension form.

* * * * *